United States Patent [19]

Hayes et al.

[11] Patent Number: 5,170,464
[45] Date of Patent: Dec. 8, 1992

[54] METHOD FOR ROLLING BACK AN EXPERT SYSTEM

[75] Inventors: Raymond R. Hayes, Palo Alto; Lo Hsieh, Los Altos, both of Calif.

[73] Assignee: International Business Machines Corporation, Armonk, N.Y.

[21] Appl. No.: 794,617

[22] Filed: Nov. 15, 1991

Related U.S. Application Data

[63] Continuation of Ser. No. 470,831, Jan. 26, 1990, abandoned.

[51] Int. Cl.⁵ .............................................. G06F 15/18
[52] U.S. Cl. ....................................... 395/76; 395/50; 395/12
[58] Field of Search ........................................ 395/76

[56] References Cited

U.S. PATENT DOCUMENTS 4,866,635 9/1989 Kahn et al. ......................... 364/513
4,868,744 9/1989 Reinsch et al. ................. 364/280.3

OTHER PUBLICATIONS

Barr, A., Feigenbaum, E., "B. Teiresias" in the Handbook of Artificial Intelligence vol. II, 1982, pp. 87–101.
Clocksin, W., Mellish, C., Programming in Prolog 2nd ed., 1984, pp. 196–209.
Date, C. J., An Introduction to Database Systems vol. II, 1983, pp. 10–11.
Wilensky, R., Lispcraft, 1984, pp. 143–158.
Wirth, N., Algorithms & Data Structures=Programs, 1976, pp. 171–174.
Schor et al., "Advances in Rete Pattern Matching", Proc. AAAI Conf., 1986, pp. 226–232.
Horowitz et al., Fundamentals of Data Structures in Pascal, Computer Science Press, 1984, pp. 65–73.
Tello, E. R., Mastering AI Tools and Techniques, Howard W. Sons & Co., 1988, pp. 205–320.

*Primary Examiner*—Michael R. Fleming
*Assistant Examiner*—Robert W. Downs
*Attorney, Agent, or Firm*—Paul W. O'Malley, Jr.

[57] ABSTRACT

A system and method suitable for use with a rule-based expert system maintains a history of execution states through which the expert system progresses during execution. A user can select a previous execution state for roll back, and later states maintained in the history are undone in reverse order until the selected state is reached. If desired, a user can define a breakpoint to which the system is to be rolled back. The corresponding executable state is determined from a retained history of all potential breakpoints, and the system is then rolled back to such corresponding executable state.

12 Claims, 9 Drawing Sheets

METHOD FOR ROLLING BACK AN EXPERT SYSTEM

This application is a continuation of application Ser. No. 07/470,831, filed Jan. 26, 1990 now abandoned.

CROSS-REFERENCE TO RELATED APPLICATIONS

The present invention contains subject matter in common with the following co-pending applications: DYNAMIC GRAPHICS DISPLAY application Ser. No. 07/471,103 now abandoned, METHOD FOR PERFORMING CONSISTENCY CHECKS application Ser. No. 07/470,865 now abandoned, and EXPERT SYSTEM DEBUGGER application Ser. No. 07/470,933 now abandoned, each of which was filed concurrently herewith by the inventors hereof, assigned to the assignee hereof, and which are incorporated herein by reference.

BACKGROUND OF THE INVENTION

1. Technical Field

The present invention relates generally to computer systems, and more specifically to a debugger suitable for use with rule-based expert systems.

2. Description of the Related Art

Expert systems are computer programs which attempt to mimic expert problem-solving behavior. They are typically used to draw conclusions from a set of observations or to propose and confirm hypotheses in order to achieve a desired goal. These systems employ rules as their basic components and manipulate the rules using a control procedure, such as forward-chaining or backward-chaining, in order to solve a particular problem.

Rules are statements of the form "IF condition, THEN action, ELSE action." The condition states one or more facts that must be true for the rule to be applied. The action parts state which actions should be taken when the rule is true or false. Actions for the true and false cases are found in the THEN and ELSE parts, respectively. The condition and actions frequently refer to variables which temporarily store information about the state of the problem solution. Thus, the action in one rule might assign a value to a variable which is used in the condition or action of another rule.

While each rule is considered an independent unit and is entered and processed in a declarative manner, the sharing of variables between rules allows them to interact. In forward-chaining systems, the effects of rule firings are propagated by repeatedly checking to see if rule conditions are true. A set of initial variable values is matched against the rule conditions. As rule conditions become true, the appropriate rule actions are executed and the resulting variable values are matched. This match-execution cycle is repeated until certain stopping conditions are met or until no rule actions can be executed.

In backward-chaining systems, the rules are used to establish values for goal variables. A set of variables are initially established as goals. Rules whose actions assign values to these variables are viewed as sources. The conditions of these rules may contain variables. If these variables have values, the rules may be evaluated to obtain values for the goals. If these variables do not have values, they are established as subgoals and additional rules are used as sources. This procedure continues until conditions can be evaluated and the effects of the rule actions ripple back through the chain of source rules, eventually assigning values to the original goal variables.

Many inference engines allow non-rule sources to be used. Frequently, function calls, database accesses, or user queries may be used to acquire a value for a variable. However, these sources don't contribute to the propagation of values in forward-chaining or to the pursuit of goals and subgoals in backward-chaining. Thus, the use of such sources to supply values for variables does not affect the interactions of rules in an expert system.

The fact that the rules may be entered in a declarative fashion and then executed in a manner which depends on the nature of the problem and data in a knowledge base means that the expert system programmer does not normally need to specify procedural interactions among rules. However, when the system does not display the desired behavior, it is often very difficult to determine exactly where the execution went awry. In typical expert systems, explanation facilities are provided in order to let the user view a trace of the steps which the expert system used to arrive at its conclusion. However, these explanations do not suffice to easily identify the problem in many cases, and are generally available only when the system needs the user to supply values or after the program has completed execution. Intermediate results of execution activities are frequently unavailable.

Typical prior art expert system debuggers include Knowledge Tool, a product available from IBM, and TEIRESIAS. Knowledge Tool uses forward-chaining and allows a user to single step through the inferencing process. The debugger halts at the end of the match-execution cycle and presents limited state information. Some static information is available before and after system execution.

TEIRESIAS, described in detail in Part 2 of KNOWLEDGE-BASED SYSTEMS IN ARTIFICIAL INTELLIGENCE, R. Davis and D. Lenat, McGraw-Hill, 1982, applies to backward-chaining systems. Limited state information can be obtained when execution halts while awaiting input of a variable value from a user. If a variable is changed, execution is restarted from the beginning.

Similar problems exist in conventional, procedural programming environments. Since the programs are written as explicit procedures, the flow of execution is generally obvious. However, the effects of variable values and intermediate results are not visible during execution. Conventional debuggers address this problem by allowing the user to specify breakpoints, which are points at which execution is halted and the user is allowed to investigate variable values and execution information.

Neither of the expert system debuggers mentioned above allow breakpoints to be defined based upon various conditions, such as variable values and rule firings, which occur during execution of an expert system. Neither is suitable for use with both forward-chaining and backward-chaining inference engines. Both utilize only a few simple debugging techniques typically found in conventional debuggers.

Since the flow of execution in a declarative, rule-based expert system is not generally known in advance, and may not even be deterministic, the approaches used in conventional debuggers are not adequate for use with expert system programs. It would be desirable for a debugger suitable for use with rule-based expert systems to provide breakpoint and user information facilities which clarify the operation of such expert systems and simplify the user's task of correcting programming errors. It would be further desirable to provide a method for resetting, or rolling back, execution of an expert system to an earlier state and allow execution of the expert system to be restarted from such earlier state.

SUMMARY OF THE INVENTION

It is therefore an object of the present invention to provide a system and method suitable for use with a rule-based expert system which allows system execution to be rolled back to an earlier state.

It is another object of the present invention to provide such a system and method wherein intervening execution can be undone without returning to the initial state of the expert system.

It is a further object of the present invention to provide such a system and method wherein user selectable breakpoints can be set, and execution of the system can be rolled back until such a selected breakpoint is reached.

Therefore, according to the present invention, a system and method suitable for use with a rule-based expert system maintains a history of execution states through which the expert system progresses during execution. A user can select a previous execution state for roll back, and later states maintained in the history are undone in reverse order until the selected state is reached. If desired, a user can define a breakpoint to which the system is to be rolled back. The corresponding executable state is determined from a retained history of all potential breakpoints, and the system is then rolled back to such corresponding executable state.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
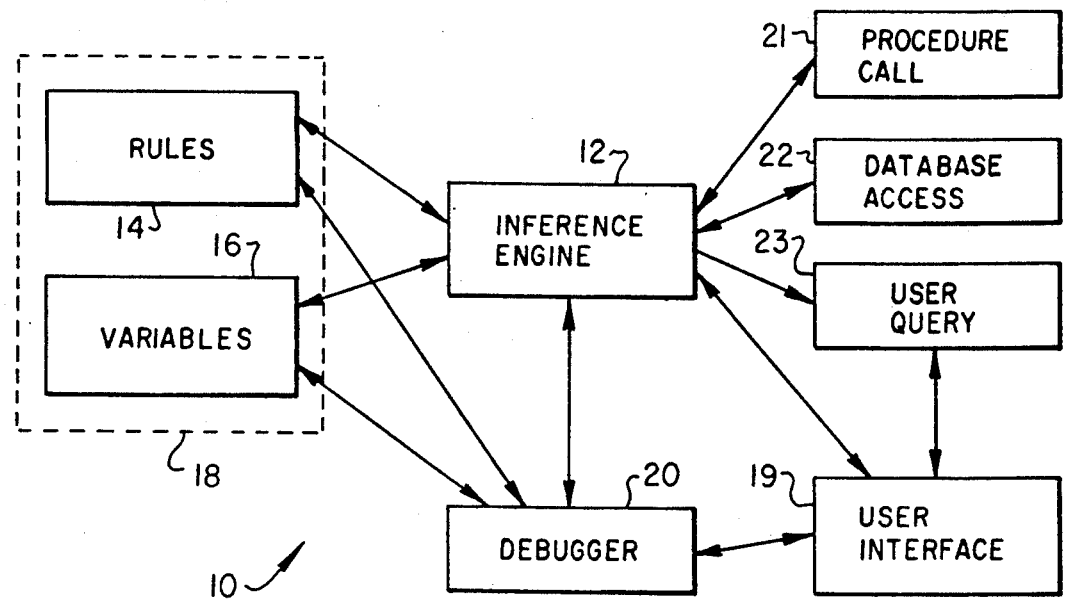
FIG. 1 is a block diagram of a system for debugging a rule-based expert system.

FIG. 1 is a block diagram of a system 10 for executing and debugging a rule-based expert system program. It includes an inference engine 12 which performs inferencing operations based on the status of rules 14 and variables 16 in a knowledge base 18. A debugger 20 is connected to the inference engine 12, and causes operation of the inference engine 12 to halt at selected times in order to allow a user to find errors in the knowledge base 18. Both the inference engine 12 and debugger 20 communicate with the user through a user interface 19, which is preferably a package for controlling output of information on a display and for accepting information as input from the user on a keyboard or mouse.

In addition to variable values 16 stored in the knowledge base 18, the inference engine can obtain values for variables from outside the expert system. Values can be obtained from procedure calls 21 to procedures written in languages such as C or LISP. Values can also be obtained by making queries to a database 22, or by querying a user directly 23. Such user queries are generally obtained by executing a procedure which displays the identity of the desired information to the user, and accepts one or more values from the user interface 19. Values obtained from procedure calls 21, database accesses 22 and user queries 23 are generally stored into the knowledge base 18. However, it is possible in some systems to perform, for example, a procedure call each time the variable value is needed, allowing the expert system a certain amount of real-time interaction with events occurring in the real world.

Figure 2:
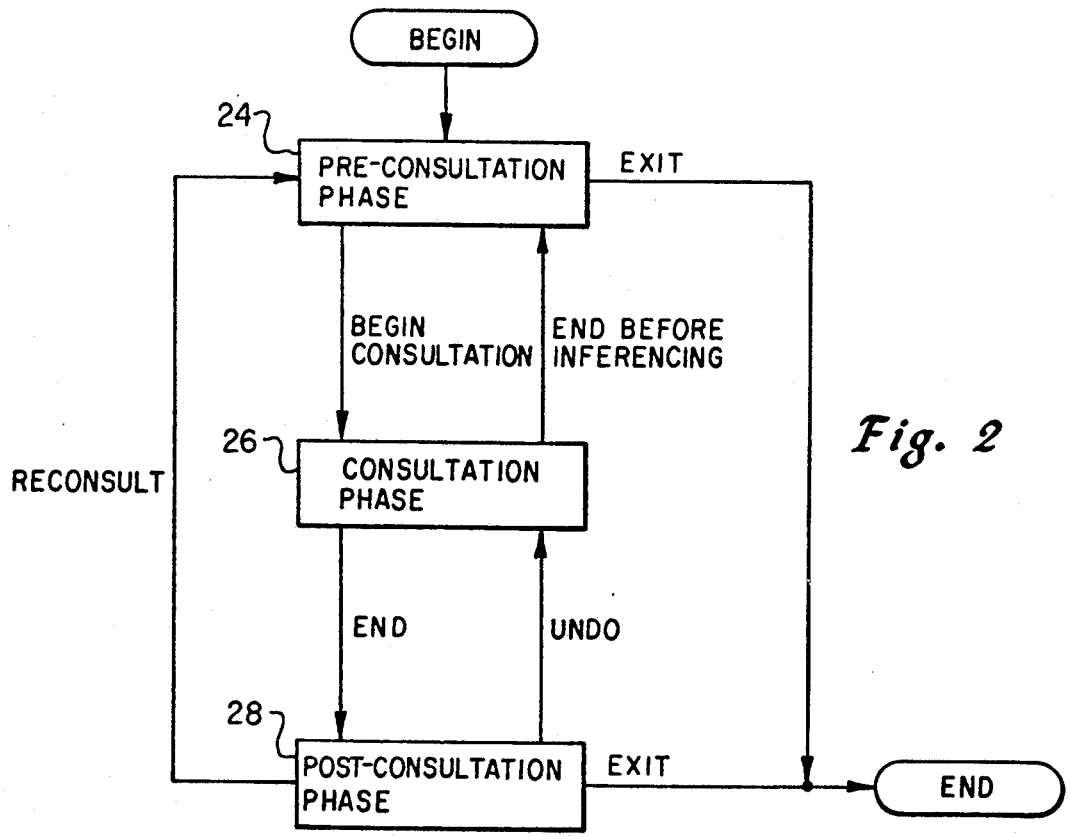
FIG. 2 is a block diagram illustrating high-level flow of control of three phases in a preferred debugger.

When an expert system embodied in a knowledge base 18 exhibits undesired behavior or incorrect answers, it is necessary for a user to trace the source of such errors. This is accomplished by invoking the debugger 20 which can monitor certain aspects of the execution of the inference engine 12 and interrupt such execution at desired points. FIG. 2 shows a high level block diagram of the debugging process.

A debugging session using a preferred debugger is broken into three phases. These are a pre-consultation phase 24, a consultation phase 26, and a post-consultation phase 28. In the pre-consultation phase 24, the user can select the particular expert system (set of rules and variables) to be used. The user can program the inference engine 12 to operate in the forward-chaining or backward-chaining mode, and may display a static structure graph of the interrelationship between the variables and rules of the expert system, called a rule/variable network. Such a graph is described in more detail in connection with FIG. 7.

The user may also examine the relationship between the rules and variables in the knowledge base 18 by invoking HOW and WHY explanation facilities. These facilities are described in more detail in connection with FIG. 8. If desired, the user can completely exit the debugger during the pre-consultation phase 24. When a user is ready to observe the operation of the expert system, control is passed to the consultation phase 26.

As described in more detail below, during the consultation phase the user may observe execution of the expert system. Selected breakpoints can be established which interrupt execution of the inference engine 12 when selected conditions, or sets of conditions, occur. Values of variables and rules may be changed during the consultation phase, and the inferencing steps used to set variables to their current values can be examined. The execution state of the inference engine can be rolled back to a prior intermediate state and execution restarted from such earlier point.

For various reasons, the user may end the consultation phase 26 before any inferencing is performed, and return control to the pre-consultation phase 24. This can be useful, if, for example, the user changes his mind about the rule set 14 to be used, or about whether forward or backward chaining should be used.

The consultation phase 26 passes control to the post-consultation phase 28 when normal inferencing completes or when an explicit command to end consultation is given by the user while execution has been halted at a breakpoint. Within the post-consultation phase, the user can access the various explanation facilities available during the consultation phase 26. The user may also decide to reconsult or undo certain portions of the inferencing performed during the consultation phase 26, which has the effect of returning control to the consultation phase 26 and reinitiating the inferencing process. Finally, the user is allowed to exit the debugger from the post-consultation phase 28.

Figure 3:
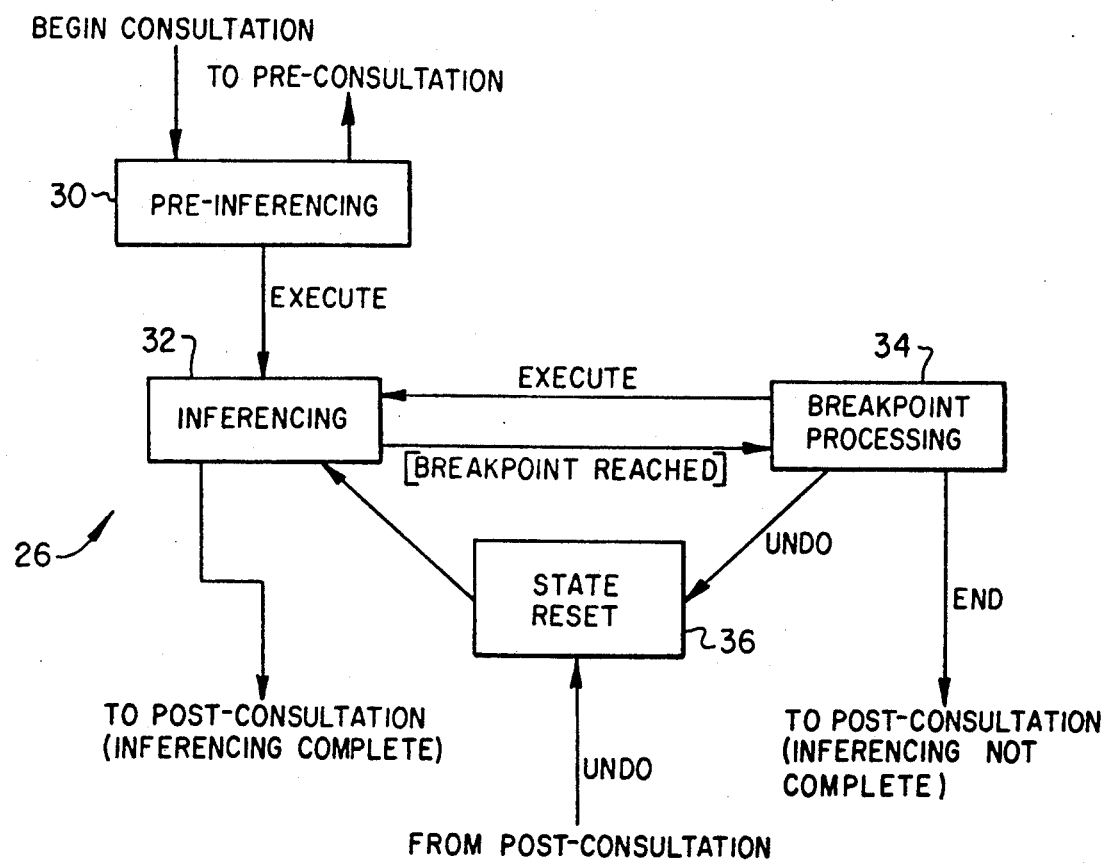
FIG. 3 is a block diagram illustrating details of a consultation phase block of FIG. 2.

Referring to FIG. 3, a block diagram illustrates flow of control within the consultation phase 26. When the user decides to begin consultation from the pre-consultation phase 24, a pre-inferencing phase 30 is entered. As described above, at any time prior to actually initiating inferencing, control can be returned to the pre-consultation phase 24.

Figure 8:
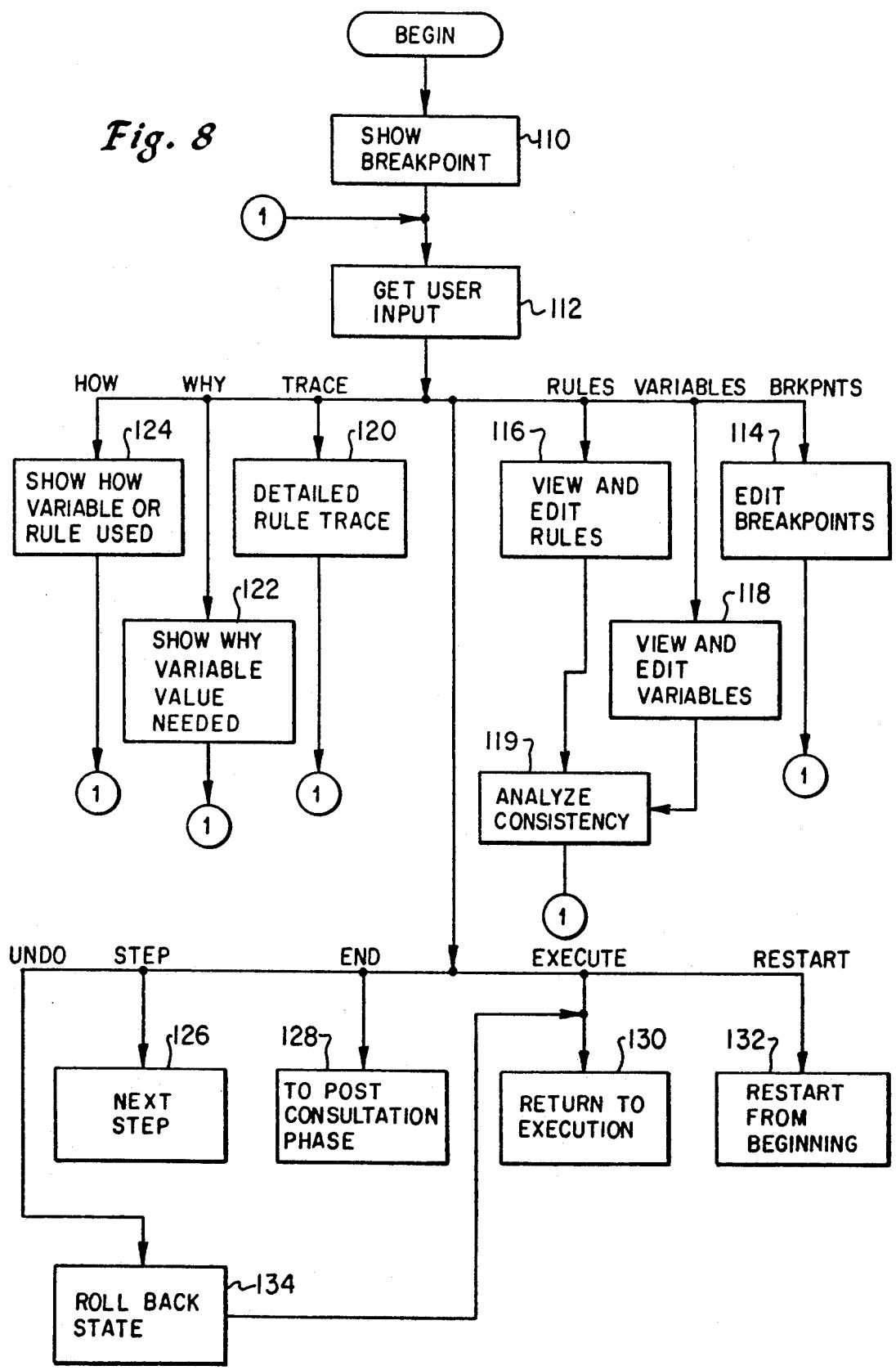
FIG. 8 is a flow chart illustrating various actions which can be taken in response to user input when a breakpoint has been encountered.

Within the pre-inferencing phase 30, the user is able to access the general breakpoint processing commands described in more detail in FIG. 8. The user is allowed to define breakpoints which will halt execution of the inference engine 12. The user is also allowed to specify whether inferencing will be performed in a normal execution mode, or in a single-step mode. Single-step mode causes the inference engine 12 to break to the debugger 20 after each inferencing event.

Inferencing step 32 represents the actual inferencing performed by the inference engine 12 on the knowledge base 18. When inferencing completes, control passes to the post consultation phase 28. If a significant inferencing activity occurs which causes a breakpoint condition to be reached, control is passed to a breakpoint processor 34. The user is allowed to examine the status and history of the execution in the breakpoint processor 34. When breakpoint processing is complete, execution resumes and control is returned to the inferencing step 32. Execution can be caused to proceed normally from the breakpoint, or single-step execution can be initiated from the breakpoint processor 34. In addition, execution can be reinitiated from the beginning or rolled back to a prior intermediate state 36 when control is returned to the inferencing step 32.

Within the breakpoint processor 34, the user is allowed to end the consultation prior to completing execution, causing control to be passed to the post-consultation phase 28. Since variables and rules can be changed from within the breakpoint processor 34, it is possible to place the consultation into an inconsistent state. In other words, if a variable value has been used during an inferencing step, and its value is now changed by the breakpoint processor, certain inferencing steps may need to be invalidated as being inconsistent with the current state of the knowledge base. If desired, the user can allow execution to proceed with an inconsistent state by returning control directly to inferencing step 32. Preferably, in most cases, the recent inferencing activity will be undone and the knowledge base and inference engine reset to a consistent state 36. Resetting the state 36 causes only as many inferencing steps to be undone as are required to back up to a point just prior to the point at which the changed variable or rule was first used. In many cases, this will be only a relatively short distance back into the inferencing process, and will be much more efficient than restarting the entire process from the beginning and redoing a large number of intermediate inferences. When the state has been reset 36, control is then returned to inferencing step 32. As described above, inferencing steps can be undone from the post-consultation phase 28, causing control to pass to the state reset step 36.

Figure 4:
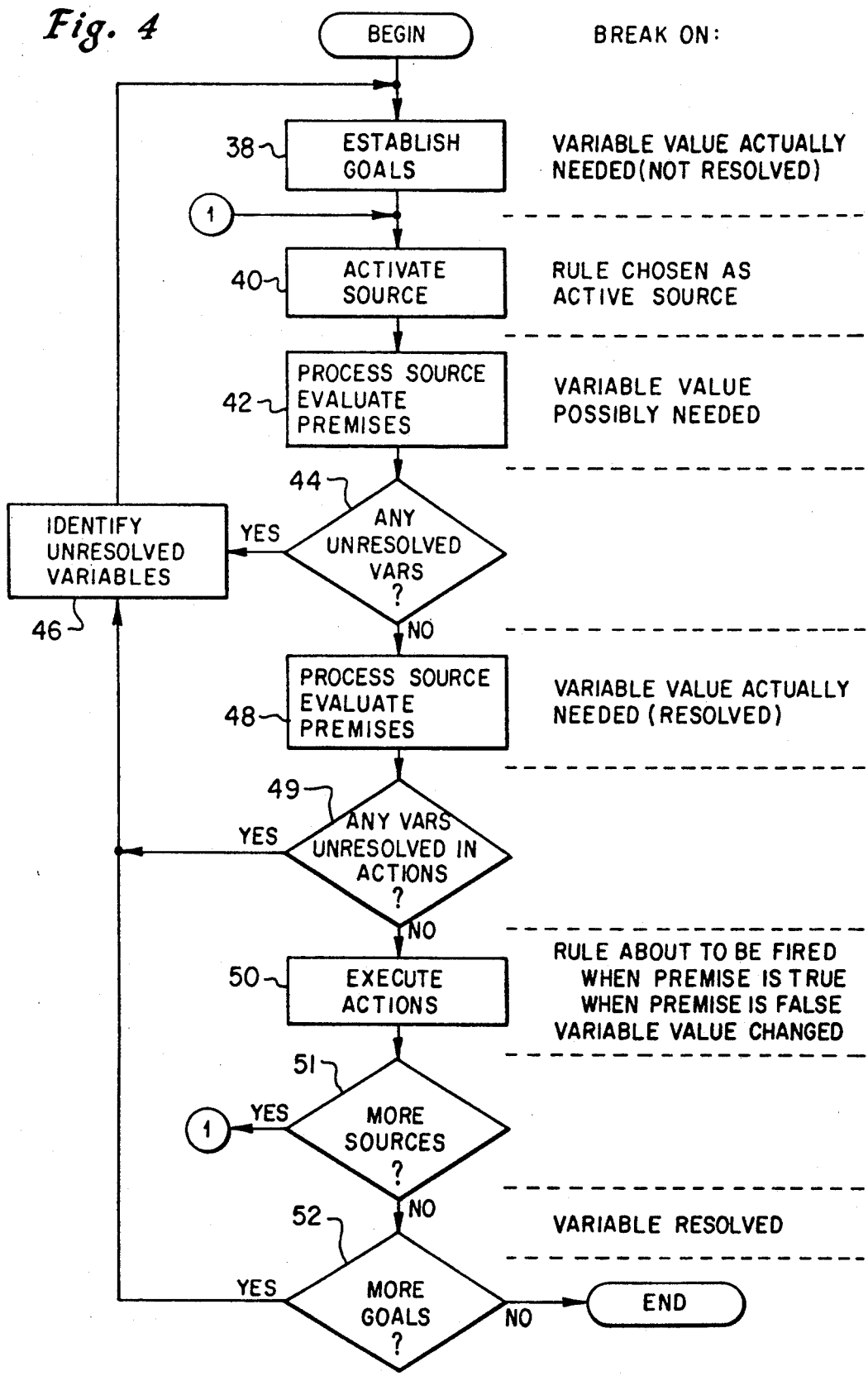
FIG. 4 is a flow chart illustrating potential breakpoints during inferencing when backward-chaining is used.

FIG. 4 illustrates processing steps which occur within the inference engine 12 when it has been selected to operate in the backward-chaining mode. Also shown are various locations within the inferencing process during which breakpoints can be encountered. In a preferred embodiment, each time an inferencing activity occurs which could generate a breakpoint, a procedure call is made to a procedure within the debugger 20 which determines whether or not any breakpoint conditions are satisfied. If so, a breakpoint is generated and control passed to the breakpoint processor 34. If not, control is returned to the inferencing process, which continues execution.

An inferencing step begins by establishing goals 38. At this point, one of the goals (variables) is not resolved. A breakpoint can be set to halt execution at this stage if a variable is selected as a goal. The next step is to activate a source 40. This means that a rule is chosen as an active source in order to resolve a goal. A procedure call is made to the debugger in order to determine whether a breakpoint has been set for the condition that the chosen rule has been activated.

The next step is to process the left hand side of the rule and evaluate its premises 42. Variables contained on the left hand side of a rule may or may not actually be needed to process that rule, but a breakpoint can be set to halt execution when selected variables are found in the left hand side of an active rule.

The next step is to determine whether any variables on the left hand side, which are needed in processing the active rule, are still unresolved 44. If any remain unresolved, the unresolved variables required to process the rule are identified 46 and control is returned to step 38 to establish one of such variables as a goal.

If all of the variables on the left hand side of the active rule are resolved, or if the active rule can be fired based on those variables which have been resolved (for example, when one variable in an OR relation is true) control passes to step 48. In this step, the left hand side of the rule is actually evaluated. Breakpoints can be generated at this time if the value of a variable is actually needed to evaluate the left hand side of the rule.

After a rule's premises have been evaluated 48, its actions are checked for references to unresolved variables 49. If any references yet remain unresolved, the variables involved should be identified 46 and one of the unresolved variables selected as a goal 38. Once the variables are resolved, breakpoints can be generated based upon whether or not the rule left hand sides are true or false. At this point, the actions on the rule's right hand side are executed 50. A breakpoint can be defined to occur if the value of a selected variable changes at this stage.

The next step is to determine whether any more sources remain 51. If all sourcing activities for a selected variable have been completed 51, the breakpoint corresponding to the variable's resolution may occur. If not, additional sources may be activated 40. The entire process is repeated until there are no more unresolved goals 52, at which time the inferencing process has come to an end.

Figure 5:
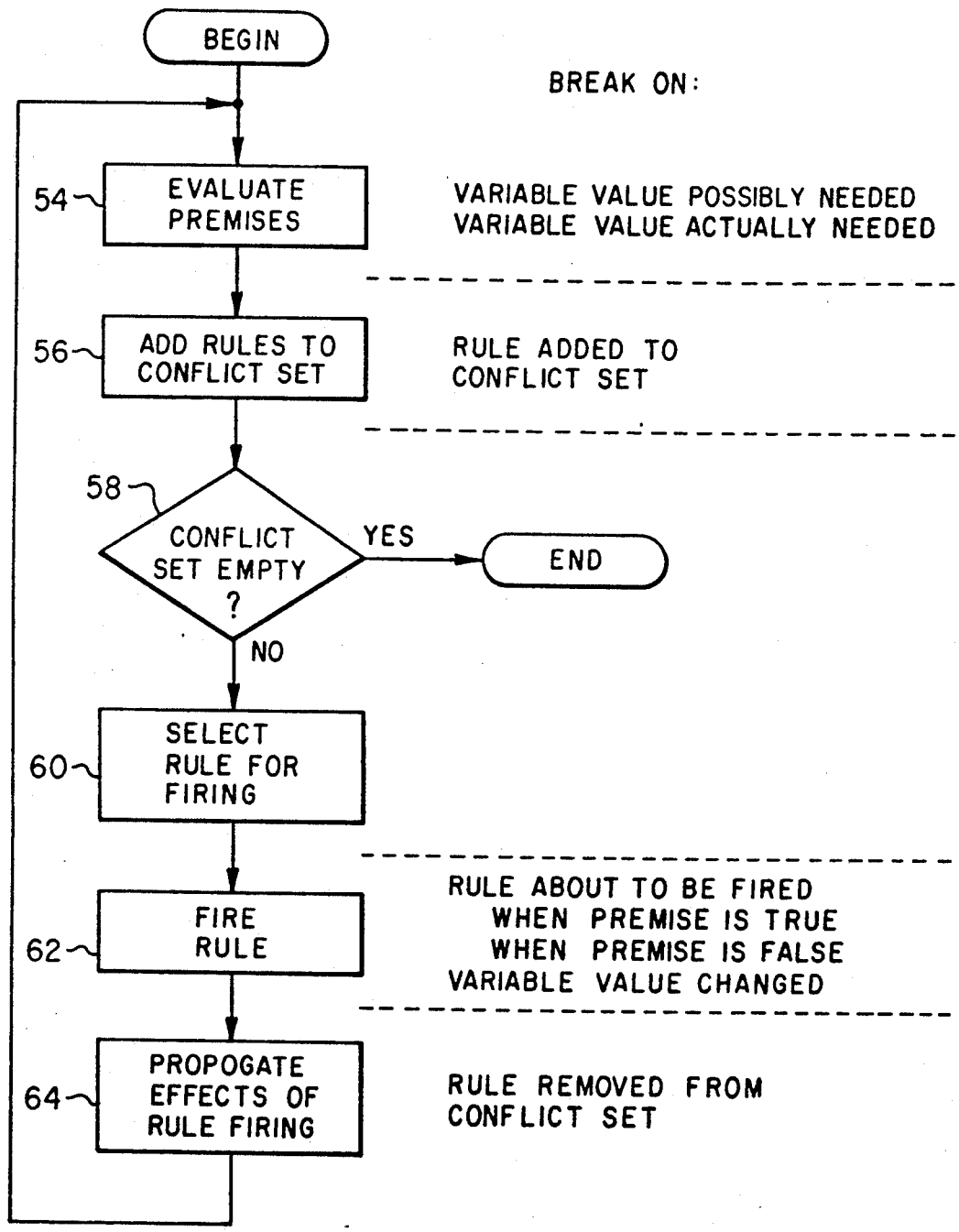
FIG. 5 is a flow chart illustrating potential breakpoints during inferencing when forward-chaining is used.

FIG. 5 shows the inferencing activities performed by inference engine 12 when forward-chaining has been selected. The various breakpoints which may be selected are also shown. As was the case with backward-chaining, determination of whether a breakpoint has been reached is accomplished by performing a procedure call each time an inferencing activity is completed which can give rise to a breakpoint, and a comparison of the current state is made with the conditions of any defined breakpoints.

The first step is to evaluate the premises of all rules that are affected by the initial data 54. A breakpoint can be defined to occur based upon whether the value of the variable is possibly or actually needed.

If all premises of a rule are true, that rule is added to the conflict set 56. A breakpoint can also be generated when a rule is added to the conflict set.

If the conflict set is empty, 58, processing is completed. If not, a rule from the conflict set is selected for firing 60 and then fired 62. A breakpoint may be defined for a rule which is just about to be fired. The firing of a rule 62 may cause the value of one or more variables to change. Breakpoints can be defined to halt execution when a variable value is changed as a result of a rule firing.

The effects of firing a rule are propagated to the rest of the knowledge base by identifying which rules are affected by the changed variables. This will cause the premises of affected rules to be reevaluated at step 54. Once all the affected rules are identified as needing reevaluation in step 64, any rule instantiation whose referenced variables have changed is removed from the conflict set. A breakpoint can be defined to occur when a rule is removed from the conflict set.

In the preferred embodiment, it is also possible for the user to halt inferencing asynchronously. This can be implemented by having the user enter a break interrupt command from a keyboard or mouse input device. Each time a procedure call is made to any debugger procedure in order to determine whether a breakpoint condition has occurred, a check is made to see whether a user has entered such a break command. If such is the case, the breakpoint processor is invoked just as if a predefined breakpoint had been reached.

As described above, one of the functions which can be performed by the breakpoint processor is to roll back the execution of the system to a previous state. This may be needed when a rule or variable is changed which has already been used during execution in order to ensure consistent execution of the system. The user can roll execution of the system back to any desired state at any time.

Figure 6A:
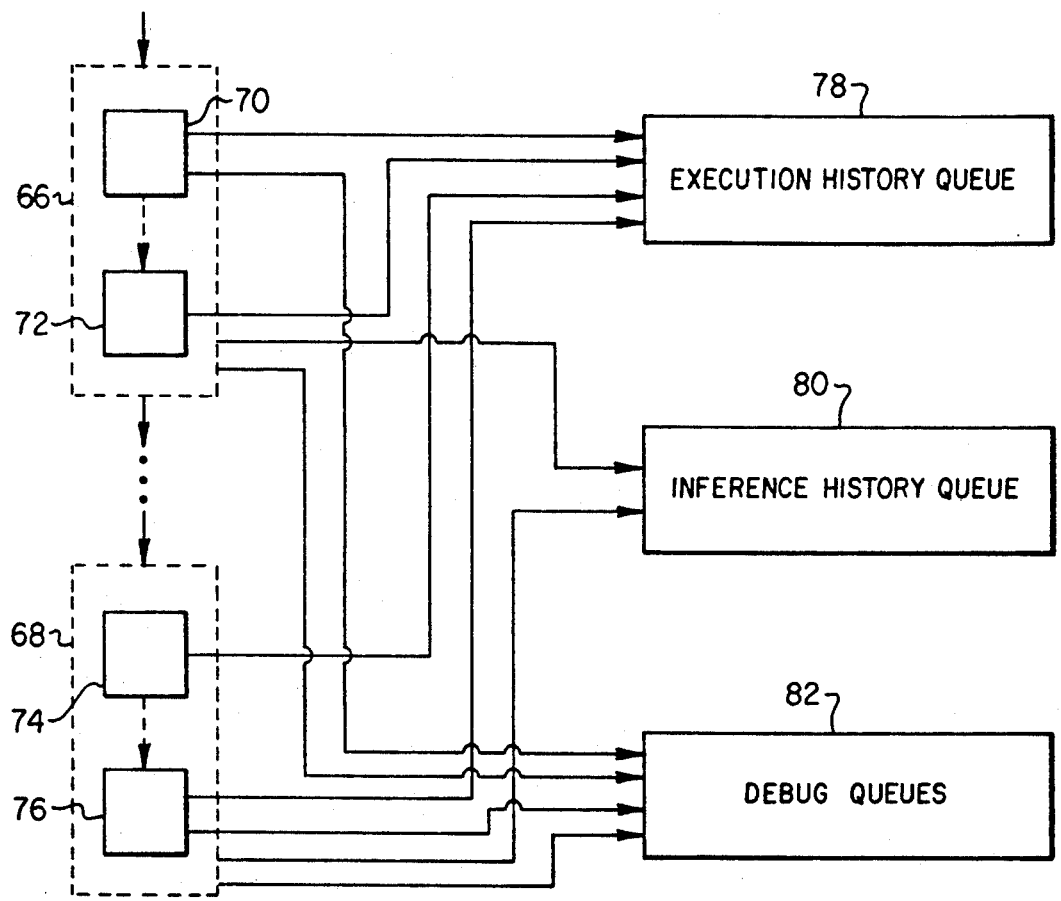
FIGS. 6(a) and 6(b) illustrate data structures used by an inference engine to support debugging according the preferred embodiment.

FIG. 6(a) shows how information necessary for resetting the execution state is saved. Inferencing events 66, 68 correspond to the events described in connection with FIGS. 4 and 5. Only two inferencing events are shown in FIG. 6(a), although more will actually exist.

Each inferencing event 66, 68 is made up of a number of execution actions. The execution actions are atomic actions taken by the inference engine to perform its various activities. Inference event 66 is made up of execution actions 70 and 72, while inference event 68 is made up of execution action 74 and 76. The number of execution actions necessary to perform a single inference event depends upon the event, and may vary from a single execution action to as many as are necessary to define a particular inference event.

Each time an execution action is performed, a record is added to an execution history queue 78. Each time an inference event completes, a record is added to an inference history queue 80. The records placed in queues 78 and 80 contain a complete description of the actions taken for each action and event. Each record placed into the queues can be removed, and its effects undone. In order to roll the system back to a prior state, it is necessary only to remove the appropriate number of records from the execution history queue 78 and inference history queue 80 in a last-in-first-out order. As each record is removed, its effects are undone, so that the execution history of the system progresses backwards through intermediate states.

A set of debug queues 82 is preferably maintained by the system. Separate queues are maintained for each rule and each variable. Each time a variable is used or changed, an identifier of such event is added to its associated queue. Each time a rule is selected as a source in backward-chaining or added to the conflict set in forward-chaining, records are added to appropriate queues to identify when such events occurred and the variables which were involved in such selection. Whenever a rule fires, the values for all variables referenced in the clauses which were used to select that rule for firing are placed into the firing history queue for that rule.

Figure 6B:
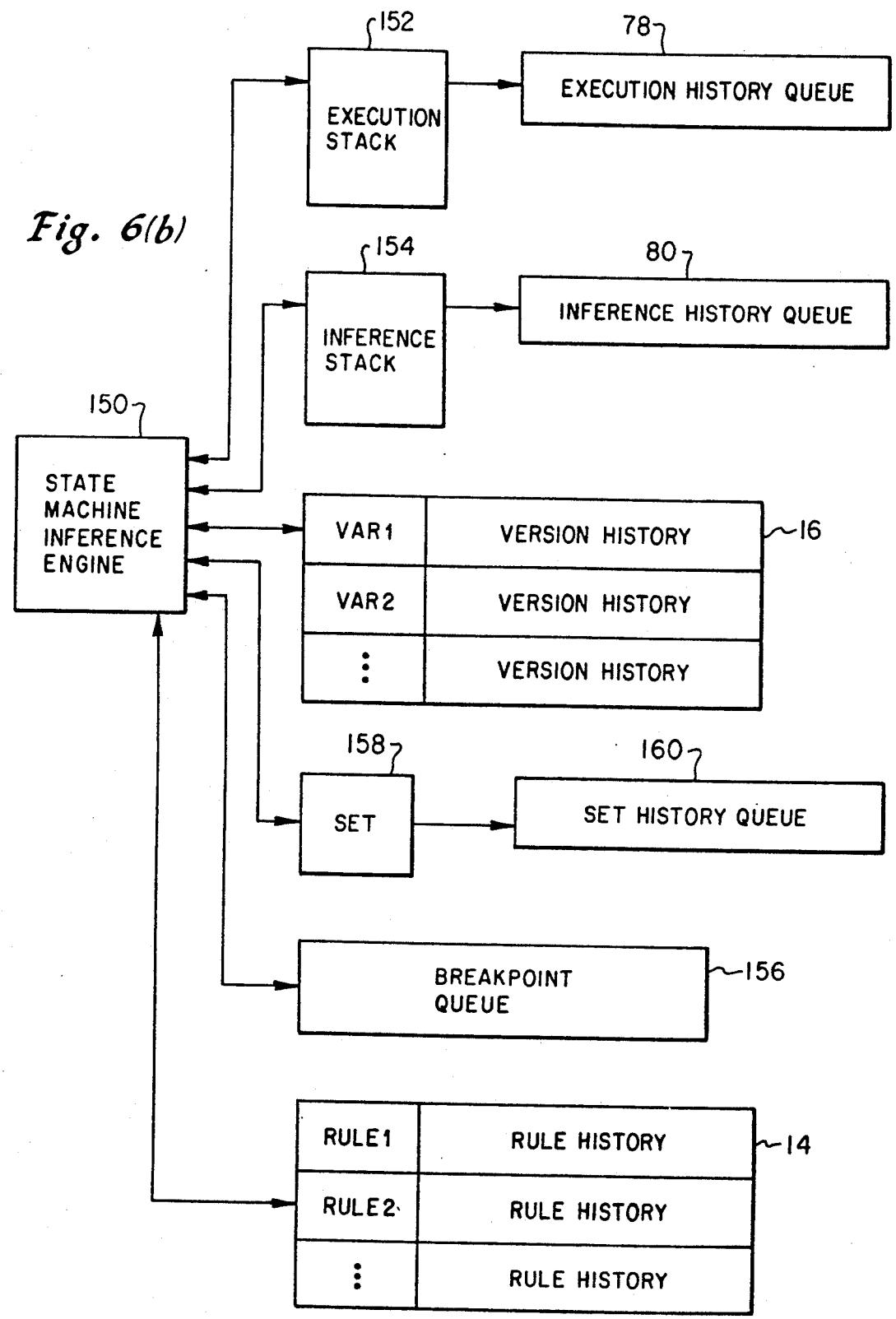

FIG. 6(b) illustrates in more detail the mechanisms by which information is saved to allow the state of the expert system to be rolled back. Inference engine 12 is preferably implemented as a state machine inference engine 150. This is a state machine which continuously loops through a fairly simple execution cycle. During each cycle, the inference engine 150 pops a record off of an execution stack 152, and adds a copy of the record to the execution history queue 78. The record added to the execution history queue 78 contains a current value of a counter which is incremented each time the execution cycle is performed. Therefore, the execution history queue 78 will contain a sequence of consecutively numbered records representing a history of the records which occurred on the top of the execution stack 152.

Each record on the execution stack 152 contains information identifying the current state in which the inference engine 150 should be. The inference engine 150 calls the necessary code to perform activities associated with that state. The code for each execution state examines the values of relevant information, makes any changes which are required, and computes the next state which should be entered. A record for the next execution state is then pushed onto the execution stack, and the cycle completes.

Typical execution states for the inference engine 150 include "check rule premise," "fire rule consequent," "obtain value," "add to conflict set," and "remove from conflict set." These execution states correspond to the atomic actions 70, 72, 74, 76 described in connection with FIG. 6(a).

The forward-chaining and backward-chaining inference processes are also preferably modeled as finite-state machines. Each process consists of a cycle of inferencing states, each of which in turn can be performed by performing a sequence of execution states. The inference states corresponds to states 66 and 68 of FIG. 6(a). Typical inference states include "match," "execute," "obtain value," and "fire rule." The number of execution states needed to perform a single inference state depends upon the complexity of the actions needed to perform the inference state. For example, the "match" state of the match-execute cycle in the forward-chaining process is made up of a number of "check rule premise" and "add to conflict set" execution states. The number required during execution depends upon the number and values of the terms in the left hand side of a particular rule. As a further example, the firing of a rule in the forward-chaining process involves two execution states, "remove from conflict set" and "fire rule consequent." The firing of a rule in the backward-chaining process also preferably involves two states: "check rule premise" and "fire rule consequent."

As inferencing activities occur, an inference state is pushed onto the inference stack 154. When the next inference state begins, a record is popped from the inference stack and copied to the inference history queue 80 in much the same manner as execution records are copied to the execution history queue 78. Each inference record copied to the inference history queue 80 contains a time stamp indicating the current execution state number in the same manner as is stored with the execution records in the execution history queue 78.

As described above, whenever the inference engine 150 reaches the state at which a breakpoint could occur, a call is made to a breakpoint procedure to determine whether a breakpoint has, in fact, been encountered. Each time such a potential breakpoint is reached, a record is placed into a breakpoint queue 156. The record placed into the breakpoint queue 156 indicates the current execution state number at the time it is placed onto the queue 156. The record also indicates the type of breakpoint for which it is being generated. For example, if a potential rule firing breakpoint is reached, this fact is identified on the record placed into the breakpoint queue 156.

A complete history of all changes made to the variables 16 is retained in a version history queue associated with each variable. This history is in addition to the debug queue history which indicates when a variable was used, when it became a goal, etc. Each time the value of a variable changes, a record is added to the associated version history queue which includes the new value of the variable and the current execution state number. As above, the execution state number functions as a time stamp to indicate when the various variables changed value.

A rule history queue is associated with each rule 14. Each time a rule is used during an execution state, an associated record is placed in the rule history queue for that rule. As before, the current execution state number is used as a time stamp.

One or more sets of various kinds are often utilized during execution of that expert system. These sets are collections of elements which may be modified from time to time. The inference engine 150 accesses such sets 158, and adds a record to a set history queue 160 each time the set is modified. Depending upon the requirements of a particular implementation, each record in the set history queue 160 can contain either a complete copy of the modified set 158, or can include only a listing of all of the elements which were added to and deleted from the set 158.

An example of such a set 158 is the conflict set used in forward-chaining. As rules are added to or removed from the conflict set, this activity is reflected in the set history queue 160. As occurs in the cases described above, the current execution state number is used as a time stamp for each record added to the set history queue 160 in order to provide a time history for activities performed on that set.

In order to roll the inference engine 150 back to a previous state, it is necessary to reset all of the stacks and queues. The execution stack 152 is rebuilt by running the inference engine 150 in reverse. All stack operations to the execution stack 152 are inverted, so that previous pushes to the execution stack 152 cause a record to be popped, and previous pops cause the last record in the execution history queue 78 to be pushed onto the execution stack 152. This reverse process continues, with the execution state number decreasing as each execution state is retrieved from the history queue 78 and pushed onto the stack 152, until the desired execution state number has been reached.

A similar process is performed on the inference stack 154 and for each set 158. When the execution state number during the reverse process is equal to the execution history number stored with the last record on each of the inference history queue 80 and set history queue 160, that record is removed from the queue. In the case of records removed from the inference history queue 80, the records are placed onto the inference stack 154. When a record is removed from the set history queue 160, the associated set 158 is updated according to the values stored in the set history queue record.

Resetting the variables 16 can be performed in a more straightforward manner. Each version history queue is simply scanned for the latest version having a time stamp less than or equal to the execution state number to which the roll back is being performed. All versions having a later time stamp are simply discarded. The history queues for the various rules 14 are rolled back in the same manner as the variable version history queues.

The breakpoint queue 156 can also be rolled back by simply discarding all records on the queue later than the selected roll back point. However, the breakpoint queue 156 can be gainfully put to use for another purpose. It can be used to define roll back states in much the same manner as breakpoints are defined when the inference engine 150 is executing in the forward direction. For example, in forward-chaining, a reverse breakpoint could be defined as the time when a rule is added to the conflict set, or removed therefrom. The breakpoint queue is then scanned from the end toward the beginning, with checks being made at each possible breakpoint. For the above example, the set history queue 160 would be checked for the conflict set at each possible related breakpoint and a quick determination made as to when the desired breakpoint is actually reached in the reverse direction. Once that breakpoint has been identified, the corresponding execution state number is identified and the remainder of the system rolled back to that execution state.

As described above, the debugger allows the user to modify variable values at a breakpoint. This can place the inference engine into an inconsistent state, inasmuch as the previous value of that variable may have already been used in earlier inferencing steps. In many cases, it would be desirable to roll the inference engine back to a state which is consistent with all of the changes made during the breakpoint session, and restart execution from there. The roll back mechanism just described can be used to reset the expert system to any earlier state once a previous consistent state has been identified. A technique will now be described for determining such a last consistent state when roll back to a consistent state is desired.

Four different increasingly "smart" techniques for determining a previous consistent state will be described. Smarter techniques result in a shorter roll back, but require more computational resources to determine the appropriate execution state to which the roll back should be performed.

The first approach is, in effect, the same as that used by prior art expert system debuggers. This approach is to restart the entire consultation from the beginning whenever a change is made to a rule or variable during a debugging session. In many cases, this would require the performance of a large amount of redundant computation, since the change which has been made may have no effect upon execution of the expert system until immediately prior to the breakpoint at which its value was changed.

The next approach is to go back to the earliest time at which a changed variable or rule could have been used. In the preferred system, this is the approach used whenever a change is made to a variable value or rule.

Figure 9:
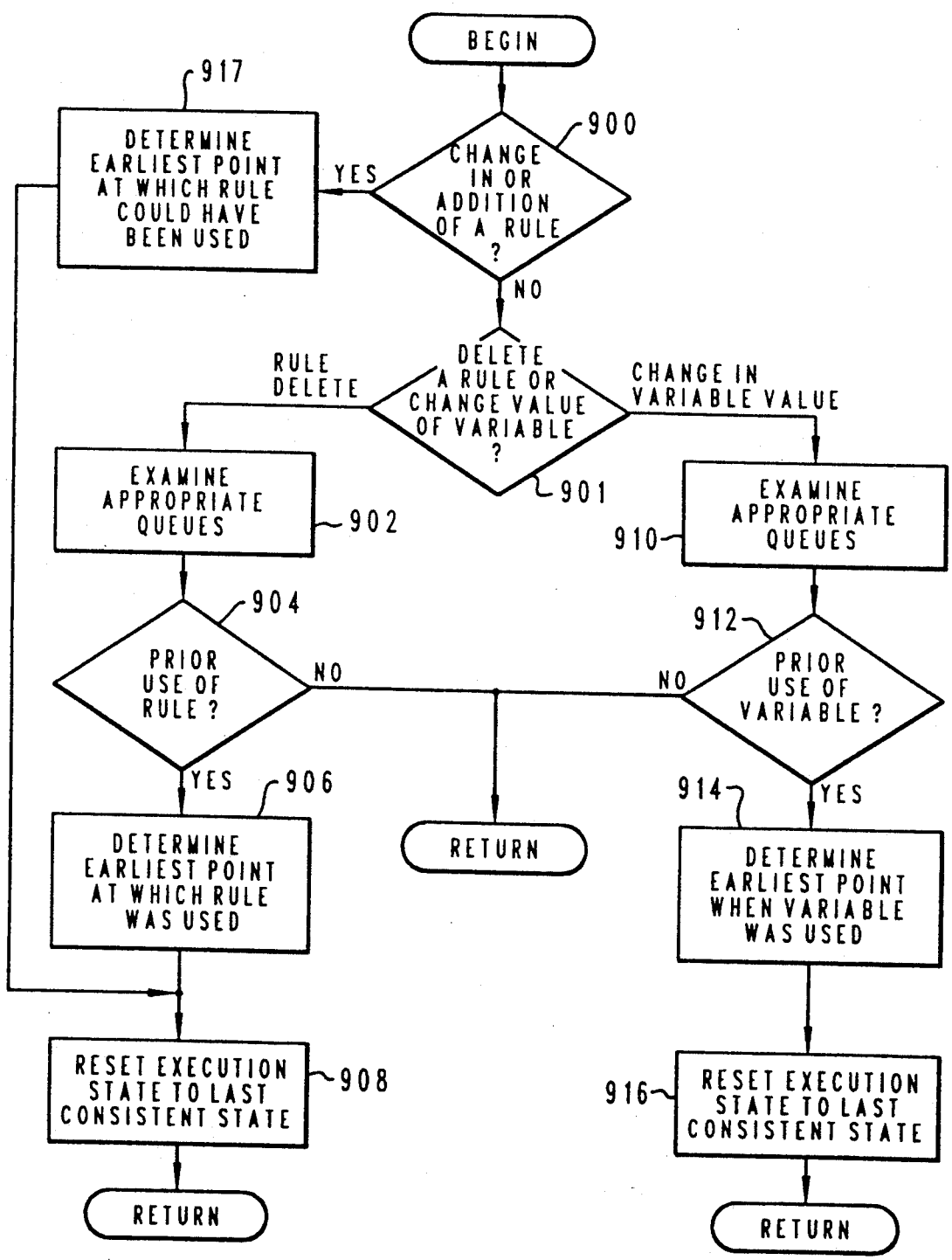
FIG. 9 is a flowchart illustrating actions taken in resetting inferencing to a selected previous execution state.

Roll back of the execution state of the inference process occurs within state reset 36, which in the flowchart of FIG. 8 corresponds to the operation block 134. The operation of state roll back block 134 is illustrated in FIG. 9. Block 134 is entered upon selection by a user of an undo operation after a change is a variable value or a rule. Ab initio, at step 900, it is determined if the change is an addition of or a change to a rule. If YES, execution moves to step 917 for determination of when the rule first could have been used. If NO, it is determined at step 901 whether the change was the deletion of a rule or a change in the value of a variable.

Whenever a change is made to a variable, the change in variable value (NO) branch from step 901, it is necessary to go back to the earliest point at which that variable could have been used. With an inference engine performing forward-chaining, this is equivalent to determining the least point at which the variable received a value from version history queue at step 910. If the variable has never received a value, no inconsistency occurs and execution can be returned to inference engine 12 (step 912). If the variable already does have a value, the earliest time at which it received such value can be determined by examining the first entry in the associated version history queue for that variable (step 914). The time stamp associated with such entry indicates how far back the inference engine must be rolled to ensure a consistent state. At step 916, the inference engine can be rolled back to the execution state number immediately proceeding the value found in the queue, which is the last consistent execution state.

When a backward-chaining inference engine is used, analogous operation of the foregoing steps is invoked. First, it is necessary to determine whether the variable was ever a goal. This can be determined by scanning the debug queue for the variable from the beginning, looking for a record indicating that the rule was selected as a goal. If the variable was ever selected as a goal, the immediately proceeding execution state is the last consistent state to which the inference engine must be returned.

The same approach can be used if desired, when a change is made to a rule. However, in the preferred embodiment, a more sophisticated test is used which utilizes the syntax of the rule to determine the first point at which the rule could actually have been used. Analogous operational steps occur in resetting the state of forward-chaining and backward chaining expert systems. Execution of the steps is described below in connection with forward-chaining.

For backward-chaining, this is accomplished by determining the earliest point at which any variable the changed rule reasons about (i.e., any variable on the right hand side of such rule) became a goal. This can be determined by looking in the debug queues for all such variables and determining the earliest execution state number found in any of the queues. An alternative technique is to scan the breakpoint queue 156 from the beginning, looking for flagged potential breakpoints of the type wherein a variable has been selected as a goal. The identity of the selected variable is then determined, and if it is one of those on the right hand side of the amended rule, the execution state immediately proceeding such selection as a goal is determined to be the last consistent state.

If forward-chaining is being used, the earliest point at which the changed rule could have been used is the earliest point at which it could have entered the conflict set. Determining this point preferably includes the determination of minimal firing sets for the changed rule. For many rules, it is not necessary for all variables on the left hand side to be defined before that rule can fire. For example, in a rule having a left hand side of the form:

(A and B) or (C and D)

it is possible for the rule to fire when only A and B are defined, and also when only C and D are defined. Thus, A and B together form an element in a minimal firing set for the rule, as do C and D together.

In order to find the earliest point at which such a rule could have entered the conflict set, it is possible to scan forward through the breakpoint queue 156 from the beginning in order to determine when the variables (A, B, C, and D in the above example) first receive values. An alternative approach which is preferred for its efficiency, is to examine (step 902) the version history queues for each variable to determine the earliest execution state number at which both A and B were defined, or at which both C and D were defined. If no prior use of the rule has occurred, execution is returned to the inference engine (step 904). If prior use is indicated (step 904 or 917) the execution state corresponding to the earliest possible use is found (step 906) and the inference engine is reset to the state immediately preceding that one (step 908). The execution state immediately preceding such execution state number is the last consistent state.

A fourth approach is similar to that just described, but also involves actually looking at the values of the variables involved on the left hand side, and determining whether the variable values actually cause the left hand side to enter the conflict set. Although such determination can result in a later calculated consistent state, requiring less roll back to be performed, it is significantly more complex than the determination just described and is not therefore preferred for reasons of efficiency. In certain systems, depending upon the values of the various variables and the structure of the rules, significant savings can be realized by performing the more complex testing. In such systems, using variable values to determine the last consistent state after a rule is changed could be justified.

The histories of the various variables and rules can be used to trace the changes which occur in variables and the points at which rules were used. This allows the user to step back through the history of a selected rule or variable one step at a time in order to determine the causes of errors.

Figure 7A:
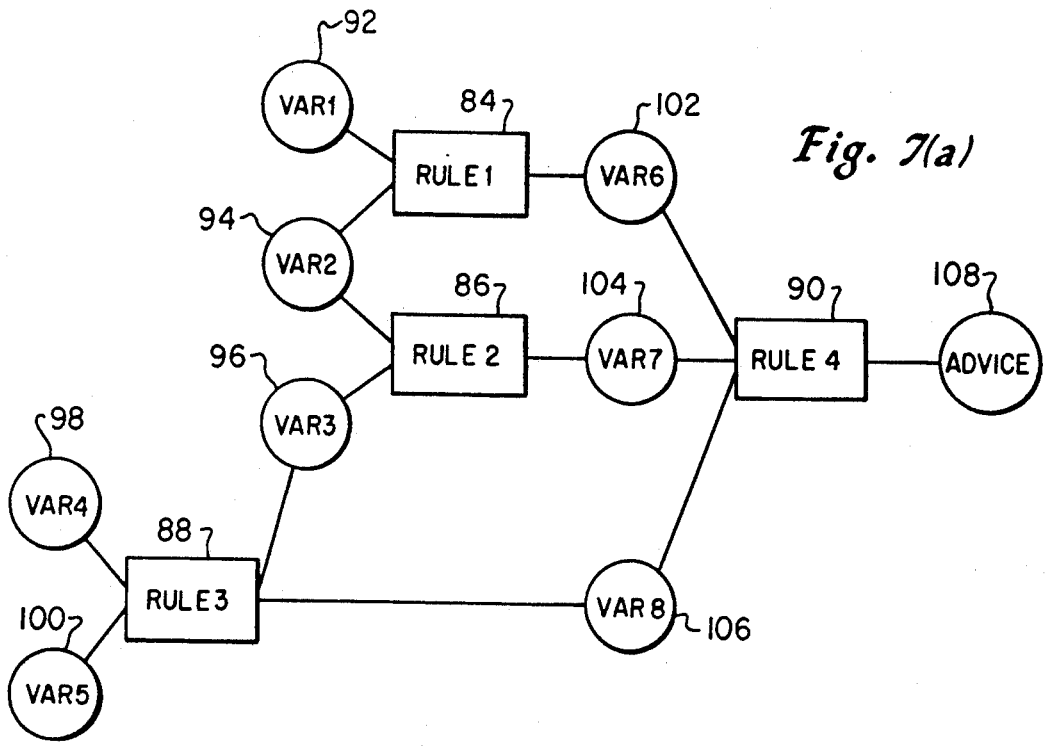
FIGS. 7(a)-(j) are example illustrations of a rule/variable network graph which can be drawn by the preferred debugger.

A debugging tool which is preferably provided by the preferred embodiment is a graphical display of a rule/variable network. An example of a simple such display is shown in FIG. 7(a). FIG. 7(a) is a graphical representation of a knowledge base having four rules 84, 86, 88, 90 and nine variables 92-108. Variables used in a rule's condition are connected to the left hand side of the rule box, and variables about which conclusions are made in a rule's action are connected to the right hand side of the rule. For example, rule 84 uses variables 92 and 94 to draw a conclusion about variable 102, and rule 88 uses variables 98 and 100 to draw conclusions about variables 96 and 106.

The network of FIG. 7(a) is used in each of the pre-consultation, consultation, and post-consultation modes. Use of the network varies somewhat depending on which mode the system is in. The static rule/variable network as shown in FIG. 7(a) is used in the pre-consultation mode to illustrate the static dependencies between the various rules and variables in the knowledge base. This can be utilized by the user to determine which rules will be affected by changing various variables, and which variables will be affected by changing various rules.

During execution of the expert system (consultation mode), a form of animation is provided for the rule/-variable network to indicate visually the progress of events within the inferencing process. To this end, various indicia can be used to illustrate graphically the progression of the inferences performed by the expert system. Changes in color or shading can be used to indicate the status of the rules and variables. If a color display is provided, changes in color can be provided for the graphical elements representing the rules and variables. If a monochrome display is provided, changes in shading can be used.

FIGS. 7(b)-7(i) illustrate a preferred scheme for representing changes in a monochrome graphical display. Each variable node 162 within the rule/variable network has a corresponding offset variable node 164. The offset variable node 164 is partially obscured by the overlying variable node 162, and is used only to help indicate status changes of the variable node 162. Each rule node 166 also has an offset rule node 168 which functions in a similar manner. In the drawings, hatching in a single direction indicates that a node is colored gray, while cross-hatching indicates that a node is colored black on a monochrome display.

Figures 7B, 7C, 7D, 7E, 7F:
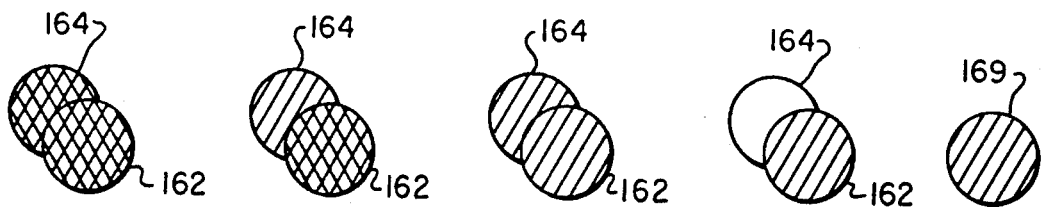

Initially, the variable node 162 and offset variable node 164 are black for every variable in the network. This situation is shown in FIG. 7(b). Assuming backward chaining is being used by the inference engine, the offset variable node 164 becomes gray whenever the variable it represents is selected as a goal. This is illustrated in FIG. 7(c). When a variable receives a value, the variable node 162 is also colored gray as shown in FIG. 7(d). When the variable is resolved, the variable node 162 remains gray and the offset variable node 164 becomes white as shown in FIG. 7(e).

Figures 7G, 7H, 7I, 7J:
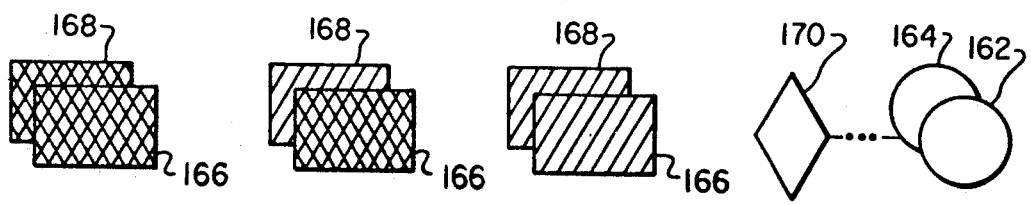

The rule nodes 166 and offset rule nodes 168 are also black initially as shown in FIG. 7(g). When a rule becomes an active source, the offset rule node 168 becomes gray while the rule node 166 remains black as shown in FIG. 7(h). When the rules fires, the rule node 166 also becomes gray as shown in FIGS. 7(i).

A similar animation technique is used when the underlying inference engine is performing forward-chaining. Variables do not become goals in forward-chaining, so no offset variable node is used. When a variable is assigned a value, a variable node 169 turns from black to gray, resulting in the display shown in FIG. 7(f). In the forward-chaining case, the offset rule node 168 becomes gray when a rule enters the conflict set, giving the display shown in FIG. 7(h), and the rule node 166 turns gray when the rule is fired as shown in FIG. 7(i).

Some variables have values initially assigned to the knowledge base. The nodes corresponding to these variables are initially assigned the graphic values used for variables which receive values. Thus, for a backward-chaining inference engine, the offset variable node 164 will be white while the variable node 162 is gray. For a forward-chaining inference engine, the offset variable node 164 will initially be black and the variable node 162 is gray.

Use of the dynamic display just described, or a similar technique for displaying status changes for the rules and variables, results in a rule/variable network which presents a dynamic visual graphic to the user. When backward-chaining is used, the right to left flow of gray through the offset variable nodes 164 and offset rule nodes 168 through the network depicts the creation of chains of goals, sources, and subgoals in the inferencing process. The left to right flow of gray through the variable nodes 162 and rule nodes 166 of the rule/variable network depicts the effects of rule firings and propagation of variable values. A similar left to right flow of gray through the network for the forward-chaining case gives a visual indication of the inferencing process.

An animated display such as described above allows a user to observe the general flow of the inferencing process without being confused by the many details which occur at each step. If the inferencing process starts to take a direction which the user knows is incorrect, he can asynchronously interrupt execution and determine the cause of the problem.

In the post-consultation phase, the rule/variable network will statically display the final status of all the rules and variables in the knowledge base. The user is able to view graphically which variables were used as goals and received values, and which rules were fired.

In some cases, a variable will be involved in a cycle. For a backward-chaining inference engine, this occurs when a variable is found on the left hand side of a rule used in a subgoal for resolution of that variable. A cycle would occur in FIG. 7(a) if, for example, the nodes for VAR4 98 and VAR7 104 actually represented the same variable. When such a cycle occurs, the usual round node 162 is placed to the right in the rule/variable network to indicate that it is a goal, and a diamond-shaped symbol is used to indicate a split variable node 170. During inferencing, the round node 164, and the diamond shape node 169 is shaded as the offset node 170 is shaded as the variable node 162. The same display technique is used in the forward-chaining case.

The procedure for changing the graphical display of the rules and nodes is easily implemented in the debugger described above. As described in connection with FIGS. 4 and 5, each time a potential breakpoint is reached, a procedure call is made to the debugger to determine whether a breakpoint has actually been reached. Each of the changes described above for the graphical display correspond to a possible breakpoint. For example, establishing a variable as a goal is a potential breakpoint as indicated by step 38 of FIG. 4. Similarly, firing a rule generates a potential breakpoint corresponding to step 50 of FIG. 4. Whenever the breakpoint debugger is called, upon occurrence of one of the events which generates a change in the graphical display, a procedure call is also made to a display manager to change the appropriate node of the display. Changes are made to the display regardless of whether or not a breakpoint is actually defined to occur at that time.

FIG. 8 illustrates a diagram of the various events which can occur when the breakpoint processor 34 is invoked at a breakpoint. First, the condition which caused execution of the inference engine to halt is displayed 110 for the information of the user. The breakpoint processor then gets an input from the user 112, and performs one of a variety of actions depending upon the user's selection.

The user is allowed to view and edit the breakpoints 114 which will halt execution of the inference engine. A menu can be presented to the user to allow him to add, edit, and delete multiple breakpoints at one time.

The user may also elect to view and edit the rules 116 within the knowledge base, or to view and edit the variables 118. If a user edits a rule or variable which has been used, a consistency analysis is preferably performed automatically by the system. A preferred method for checking consistency was described above. If the change puts the system into an inconsistent state, the user is signaled. The user will have the opportunity to roll execution back to a consistent state if desired.

The user may perform a detailed rule trace 120, which presents detailed information about a particular rule firing. Namely, the values of all variables referenced and the truth values for each premise condition are shown. This level of detail is not provided by prior art explanation facilities, but is necessary for debugging.

The user can elect to be shown why a variable value is needed 122, or how a value was obtained 124. The WHY inquiry 122 displays the reasons that the control procedure (forward or backward chaining) might need a value for a particular variable, or how that variable's value might ripple through the various rule and variable interactions. The HOW inquiry 124 displays how the control procedure would go about trying to determine a value for a particular variable. The WHY inquiry is essentially a forward looking question, and asks "why do I need this information?" The HOW command is essentially a backward looking question, and asks "how did things get to be this way?"

During the consultation phase, both the HOW and WHY inquiries can be used to determine both past and future usages for a rule or variable. The WHY inquiry 122 shows where a variable has been used (past) and where it might yet be used (future). The debug queues are used to obtain the past information, while the static rule/variable network is used for future case, just as occurs during the pre-consultation phase. The HOW inquiry 124 also uses the debug queues to obtain the past information showing how a variable received its current value or a rule was caused to fire. The HOW inquiry 124 relies on the static rule/variable network to answer queries regarding events that have not yet occurred, in a manner similar to the WHY inquiry 122.

During the pre-consultation phase 24, the HOW and WHY inquiries can be used only to find the possible steps which might be taken by the inference engine. During the consultation phase 26, and post-consultation phases 28, information on past, present and future events is also available.

As described above, the user may choose to exit the breakpoint processor 34 in several different ways. The user may begin or continue single step execution 126 of the inference engine. Control will return to the breakpoint processor 34 after a single step is completed. The user may end the consultation phase prematurely, and go directly to the post-consultation phase 128. The user may also cause an exit from the breakpoint processor and a return to normal execution 130, or may cause the system to restart execution from the very beginning 132. The execution state may be rolled back 134 to a selected state or one defined by a reverse breakpoint. This will often be done after the consistency analysis 119 indicates that a change has introduced an inconsistency, and the option of rolling back directly to the last consistent state is provided to the user.

The rule-based debugger described above allows a user to obtain detailed information about the progress of the expert system program. Breakpoints can be set and changed dynamically, and changes can be made to rules and variable values in order to observe the effect of such changes on the overall execution of the system. The same debugger can be used to support both forward-chaining and backward-chaining on a knowledge base, and consistent interactions with the user are used in both cases. Detailed information regarding the history of the execution is available to the user in several forms, and the execution state can be rolled back to a previous intermediate state. This latter capability allows changes to be made to rules and variables without requiring that inferencing be restarted from the very beginning.

It will be appreciated by those skilled in the art that an analogy exists between rule firing in an expert system and concurrent operation of processes in a parallel processing system. In theory, many rules could operate concurrently, so long as there is no rule interdependency. If each rule is mapped to a process in a parallel system, with message passing or shared variables used to communicate changes, processes with no interdependencies may be executed concurrently.

The debugger described above can be used with such an expert system. It is designed to provide useful debugging information when the ordering of events is not known in advance. Since this situation is encountered in parallel processing systems, generally, the debugger described above can be used, with proper modifications, with such systems. Breakpoints can be defined for each process separately, and the debugger is invoked when one of them is reached. Depending on the system design, remaining processes can also be halted or can continue. A tool analogous to the rule/variable network can be used to illustrate graphically the relationships between processes using messages or shared variables. The ability to examine the execution history of the various processes is useful for debugging parallel systems in much the same manner that it is useful for debugging rule-based systems.

While the invention has been particularly shown and described with reference to a preferred embodiment, it will be understood by those skilled in the art that various changes in form and detail may be made therein without departing from the spirit and scope of the invention.

We claim:

1. A method for rolling back the state of a rule-based expert system on an inference engine, comprising the steps of:

providing an inference stack of state records;

providing an execution stack of execution state records, each of which identifies a state for the inference engine;

responsive to user selection of at least a first breakpoint condition definition, establishing at least a first breakpoint for the inference engine;

operating the inference engine to generate a chain through a rule/variable network by removing inference state records and execution state records from the inference stack and the execution stack, respectively;

advancing an execution state number with each execution state record removed from the execution stack;

for each inference state record removed from the inference stack, copying the inference state record with a current execution state number to an inference history queue;

for each execution state record removed from the execution stack, copying the execution state record with a current execution state number to an execution history queue;

upon the inference engine encountering a breakpoint during operation, adding an entry to a breakpoint history queue;

accepting a breakpoint condition definition for rollback of the execution state from a user;

comparing the accepted breakpoint condition definition and the entries in the breakpoint history queue to determine a desired execution state and its state number;

resetting the inference and execution stacks by moving state records and copied execution state records from the inference history queue and execution history queue to the inference stack and execution stack, respectively;

for each copied execution state record replaced from the execution history queue to the execution stack, reducing the execution state number and retracing the chain through the rule/variable network; and discontinuing resetting of the inference and execution stacks when the execution state number equals the state number for the desired execution state.

2. The method of claim 1, wherein said step of comparing comprises the steps of:

scanning the breakpoint history queue from the most recent entry;

for each entry in the breakpoint history queue, determining whether such entry matches the breakpoint condition definition accepted from the user; and when an entry matches the accepted breakpoint condition definition, selecting the execution state corresponding to such matching breakpoint entry as the desired execution state.

3. The method of claim 2, further comprising the step of:

when the desired roll back execution state is determined, deleting the matching entry, and all later entries, from the breakpoint history queue.

4. A method for rolling back the state of a rule-based expert system as set forth in claim 1, and further comprising:

generating version queues for variables in the expert system, wherein a version record is added for a variable in connection with occurrence of an execution state wherein the variable was used or assigned a value and wherein each version record in each version queue provides a variable value and the execution state number for a point when the variable was used in the inference engine; and in the step of resetting the inference and execution stacks, deleting all version records from the version queues having execution state numbers after the number for the desired execution state.

5. A method of rolling back the state of a rule-based expert system as set forth in claim 4, and further comprising:

generating an inference history queue, wherein a record in the inference history queue includes an execution state number.

6. The method of claim 1, and further comprising:

before operating the inference engine, providing a resettable inference queue and an inference history queue;

with operation of the inference engine updating the resettable inference queue; and with operation of the inference engine adding a record to the set history queue with each update of the resettable inference queue;

the step of resetting further including retracting changes made to the resettable inference queue using records from the inference history queue.

7. A system for rolling back the execution state of a rule-based expert system to a previous state, comprising:

an inference stack comprising a plurality of inference state records;

an execution stack comprising a plurality of execution state records;

a breakpoint history stack comprising a plurality of breakpoint occurrence records;

inference engine means operating on the inference state records and execution state records for moving through a sequence of execution states;

means for generating history queues associated with said inference and execution stacks, respectively, said history queues each containing entries corresponding to entries popped from said stack during execution;

means responsive to user specification of a breakpoint condition definition for determining a desired roll back execution state from the breakpoint occurrence records; and means operating on said inference and history stacks and said associated history queues for reversing the inference engine means until the desired roll back execution state is reached, wherein stack entries which were pushed onto said history queues during execution are popped therefrom, delivered to the inference engine and pushed onto said inference and execution queues to obtain the desired roll back execution state in the rule/variable network.

8. The system of claim 7, wherein said execution stack records corresponde to execution states of said inference engine; and said inferencing stack records corresponde to inferencing states of said inference engine.

9. The system of claim 7, further comprising:
a version queue for variables in the expert system, wherein said reversing means includes means for deleting versions of variables occurring after the desired roll back execution state.

10. The system of claim 7, further comprising:
a plurality of inferencing sets;
a set history queue for each inferencing set, wherein said reversing means further includes means for reversing operations on each inferencing set using entries in the corresponding set history queue.

11. The system of claim 7, wherein the breakpoint history queue contains an entry for each possible breakpoint reached during execution of said inference engine and wherein each entry corresponds to an execution state.

12. The system of claim 12, wherein said determining means comprises:
means for scanning said breakpoint history queue in reverse order to locate an entry matching the desired breakpoint, wherein the desired roll back execution state is set equal to the execution state corresponding to such matching entry.

* * * * *